July 26, 1932.  F. BARTLING  1,869,235
PROCESS FOR THE CONSERVATION OF UNSTABLE,
HYGROSCOPIC, OR VOLATILE GRANULAR MASSES
Filed March 25, 1930
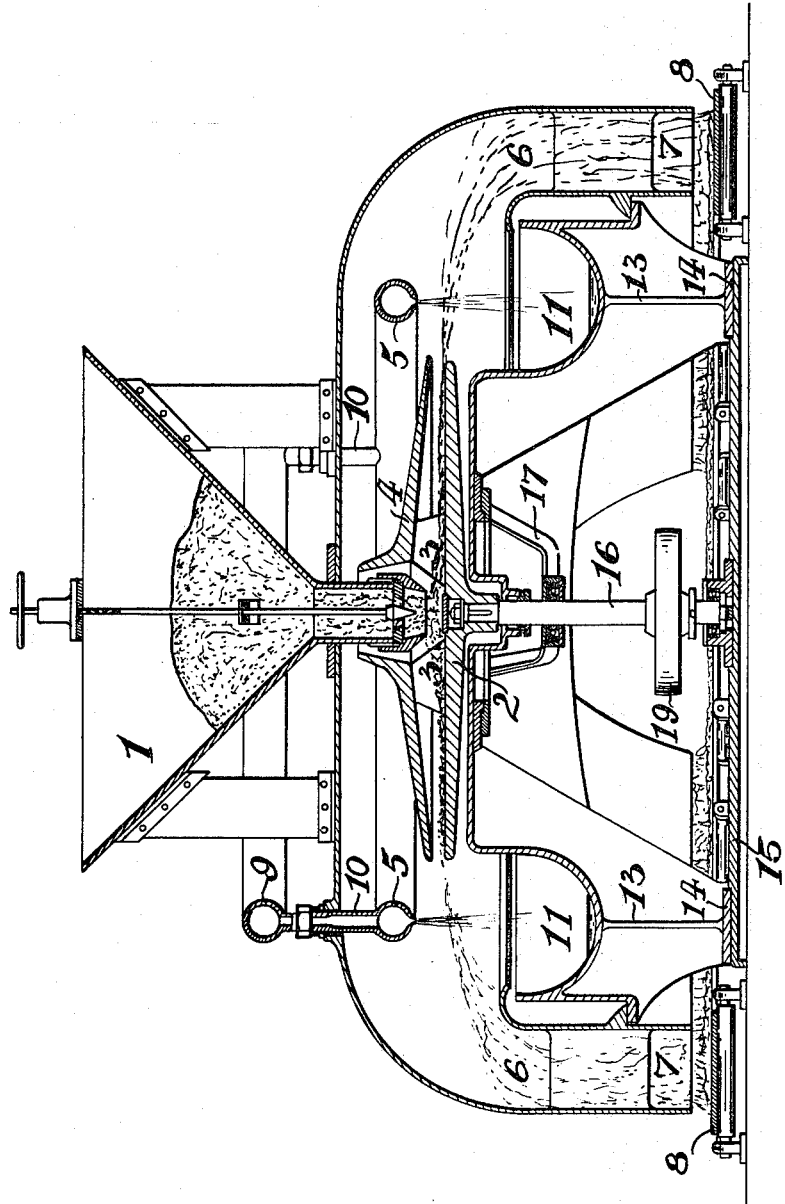

Patented July 26, 1932

1,869,235

UNITED STATES PATENT OFFICE

FRIEDRICH BARTLING, OF HUGLFING, GERMANY

PROCESS FOR THE CONSERVATION OF UNSTABLE, HYGROSCOPIC OR VOLATILE GRANULAR MASSES

Application filed March 25, 1930, Serial No. 438,860, and in Germany March 26, 1929.

A large number of substances are known, which contain decomposable, volatile, hygroscopic or otherwise unstable constituents, which undergo prejudicial changes, especially under the influence of atmospheric air and moisture. Frequently these unstable constituents are of particular importance for the application of the substance in question, so that it is inadvisable to convert them into a more stable form by any processes which could otherwise easily be applied in many cases. As an example of such circumstances I may cite chemical fertilizers, in which, as is well known, the volatile and hygroscopic constituents are of special fertilizing value. The practice of enclosing substances susceptible to atmospheric influences in airtight packages is of course widely known and employed, but this process is impracticable for reasons of cost for substances of granular character which are used in large quantities, such as chemical fertilizers. Various processes are also known for covering such perishable materials with a thin protective coating by immersion in a solution of any protective agent, after which the solvent may be removed by drying, evaporation or the like. This procedure also is not generally applicable to all perishable materials containing granular substances, particularly if these are finely granular, as firstly the treatment is too costly on account of the complication and duration of the mechanical coating process and secondly because the coating materials which are so added in relatively large quantity to the active ingredients act purely as diluents and consequently diminish the effectiveness of the product relatively to its weight, which governs freight charges, and consequently any such procedure is impossible on account of the increase in these.

In contrast to the processes just described and hitherto used, the inventor solves the problem by purely chemical means in such a manner that no added foreign body is used to coat the granules of the original material, but that the coating is obtained by chemical action on the substances already present in the same. The invention therefore consists in a process of stabilizing granular materials, especially those which are finely granular, which contain easily decomposable, volatile, or otherwise unstable substances, by subjecting the granular mass to a superficial chemical treatment, by means of which the unstable substances are converted into stable form in the surface layer only of each granule of the material. The process is especially suitable for the treatment of chemical fertilizers supplied in fine granular form.

The technical advantage of this process consists more particularly therein, that in consequence of the intensive action of the chemical forces it is possible to effect the process very rapidly. It follows further, and more particularly from the chemical action of the liquid reagent on the treated product, that the surface only of the treated granule undergoes chemical change. Any further penetration of the granules by the chemical reaction, such as would be caused by prolonged action of the reagent, is to be avoided, because the main technical advantages of the process are obviously associated with the formation of as thin a protective coating as possible. It is consequently essential for the industrial exploitation of the process that the surface should be exposed to the action of the coating reagent for a very short time only.

The process according to the invention complies very fully with this condition, as the chemical transformation of the surface (for example of crystals of chemical fertilizers) into a more weather-proof material can be effected in an extremely short time by the choice of suitable reagents of rapid chemical action. In this manner a very thin and absolutely continuous protective layer round each granule is obtained.

It is obvious that by suitable choice of the reagent chosen for surface treatment the reactions can be so conducted that the protective layer contains no substances prejudicial to the application of the treated material.

As a further development of the new process, for example in its application to chemical fertilizers, the less stable substance may be caused to interact with a reagent of such character that a stable compound is formed in the protective layer which also possesses fertilizing properties. An application of the process of this character consists, for example, in the treatment of the chemical fertilizer, ammonium bicarbonate, which, as is already well known, volatilizes to a very considerable extent during normal storage, with a solution of sodium chloride. The action of the solution of sodium chloride, NaCl, results in the immediate conversion of the ammonimum bicarbonate, $NH_4.HCO_3$, into sodium bicarbonate, $NaHCO_3$, and ammonium chloride, $NH_4Cl$, which are well known to be considerably more stable than ammonium bicarbonate. Crystals of ammonium bicarbonate which have been treated for a short period with sodium chloride solution in accordance with the invention, and the surface of which has thus been coated with a layer of sodium bicarbonate, can be stored and used without special precautions in the same manner as other stable chemical fertilizers. In this case the surface treatment provides a protective coating to the unstable nucleus of the crystal.

The reagents to be used in the various cases of surface treatment in accordance with the invention may be chosen from case to case in accordance with their known properties, and it is very advantageous in the technical application of the process that these should be chosen from the very large number of available compounds in such a manner as to provide the most suitable coatings for the varied technical applications of the treated products.

The technical application of the process can be conducted in very varied manners. For example, the solution of the reagent may be aspirated or pressed through a thin layer of the material to be treated. A process for the production of such coated materials, for example, of ammonimum bicarbonate granules, coated with a protective layer of sodium bicarbonate, consists, for example, in moistening a thin layer of ammonium bicarbonate crystals in a vacuum suction filter with sodium chloride solution for a short period. In order that the surface of the crystals may be slightly moistened only, the ammonium bicarbonate crystals may suitably be treated with a physically dispersed solution of sodium chloride and excess solution is simultaneously drained from the crystals by suction. By a physically dispersed solution I mean a spray or mist. By contact of the surface of the ammonium bicarbonate crystals with sodium chloride solution, ammonium chloride solution is formed in addition to sodium bicarbonate. As the solution acts on the ammonium bicarbonate crystals for a very short period only, the greater portion of the ammonium chloride is drained from the transformed surface in the form of a solution of that substance. On subsequent drying of the coating of the crystals, the small amount of moisture still contained in the sodium bicarbonate deposits the ammonium chloride which it contains in solid form. As these quantities of ammonium chloride are very small, on account of the very small amount of moisture remaining in the coatings of the particles after draining on the vacuum filter, the protective layer will consist mainly of sodium bicarbonate with a few crystals of ammonium chloride. This ammonium chloride is also more stable than the coated ammonium bicarbonate and is also well known to be a fertilizer of valuable properties.

A remarkable degree of stability is also conferred on the ammonium bicarbonate crystals by the relatively simple treatment described above.

A further method of carrying out the chemical surface treatment of volatile substances according to the new process is described below and in this case also will deal by way of example with the application of a protective layer of sodium bicarbonate to ammonium bicarbonate crystals. Particles of ammonium bicarbonate are projected in a comparatively narrow layer through an open space. A fine spray of sodium chloride solution is projected in a direction at right angles to this dispersed stream of projected particles, so that in consequence of the high velocities of both the ammonium bicarbonate crystals and the spray of sodium chloride solution, the crystals are but slightly moistened at the intersection of the two streams. Each crystal is moistened over the whole of its surface and a purely surface layer of sodium bicarbonate is immediately formed, which completely encloses the nucleus of ammonium bicarbonate. During this process, therefore, a chemical reaction occurs at the surface of the ammonium bicarbonate particles only whilst the proportions of coating liquid can be regulated in the simplest manner by varying the thickness of the rain or spray of salt solution, or of the stream of ammonium bicarbonate crystals, or of the velocity of the streams of crystals and of salt solutions.

In the drawing a device for carrying out such a process is shown in medium section by way of example.

Referring to the drawing, the hopper 1 constantly supplies the disc centrifuge 2 with ammonium bicarbonate crystals at a constant rate. The supply can be regulated, as shown, by means of an axially adjustable cone in the hopper 1. At its central portion, near the point of supply of the material, the disc centrifuge 2 is provided with a plurality of vanes 3, which support a covering disc 4. This prevents any of the crystals from separating from the main stream, which becomes progressively thinner in an outer direction, or from escaping from the disc at an oblique angle. At the rim of disc 2 the material escapes from the disc in a very narrow layer, the velocity of which can easily be regulated by the rate of revolution of the disc. The disc 2 is surrounded at a slight distance by the annular nozzle 5, which projects a fine spray of sodium chloride solution vertically on to the thin layer of ammonium bicarbonate crystals projected from the disc. The interpenetration of the spray of salt solution, with the stream of ammonium bicarbonate crystals, causes the latter to be completely coated with the solution with extreme rapidity; this immediately interacts with the surface layers of the crystals, converting these into sodium bicarbonate, which is stable.

In consequence of the centrifugal action of the disc 2, the stream of crystals, which has been treated in the above described manner, and the nucleus of which still consists of ammonium bicarbonate, passes straight through the spray of salt solution and falls into the collecting chamber 6, from which the material passes through the slot 7, and on to the annular plate 8. During its passage over this plate or along a belt-conveyor attached to the same the treated ammonium bicarbonate crystals are dried by gentle heating.

The sodium chloride solution is conveyed to the circular nozzle 5 through the supply pipe 9, and the three branch supply pipes 10. The excess of salt solution is received and discharged by the discharge trough 11. This is disposed with a fall to one side of the apparatus and the collected liquid is drained from the lowest point of the discharge trough.

The discharge trough 11 is attached to an annular base 14 by supporting ribs 13; this annular base is mounted and centered on the bed-plate 15, as is also the lower bearing of the driving shaft 16. The upper bearing of shaft 16 is supported by a supporting ring 17. A belt-pulley 19, for driving the disc centrifuge, is mounted between the two bearings.

The device already described could also be operated by supplying sodium chloride solution to the disc centrifuge and so producing an annular spray. The annular nozzle 5 would then be replaced by an annular distributor which would cause the ammonium bicarbonate crystals to trickle down as a disperse annular stream in such a manner that on passing through the spray of sodium chloride solution produced by the disc centrifuge they would receive a thin coating of sodium chloride solution, which would react to form a coating of sodium bicarbonate on each crystal. The discharge trough 11 would then receive the crystals and the annular chamber 6 the surplus solution not retained by the crystals. The annular plate 8 would then be suitably disposed below the annular outlets of the discharge trough 11, whilst the chamber 6 would take the form of an inclined trough for discharging the surplus solution.

I claim:

1. A process for stabilizing ammonium bicarbonate which comprises subjecting the said ammonium bicarbonate in crystalline form to the influence of a physically dispersed solution of sodium chloride, whereby a thin protective covering of sodium bicarbonate is formed on the said crystals.

2. A process for stabilizing ammonium bicarbonate which comprises rapidly projecting the said ammonium bicarbonate in crystalline form through an atmosphere containing a physically dispersed solution of sodium chloride and immediately withdrawing excess solution from the said crystals, whereby a thin protective covering of sodium bicarbonate is formed on the said crystals.

In testimony whereof I have signed my name to this specification.

FRIEDRICH BARTLING.